(12) United States Patent
Albright et al.

(10) Patent No.: US 11,294,605 B2
(45) Date of Patent: Apr. 5, 2022

(54) AUTOMATICALLY RECONFIGURING A WEB PRINTER

(71) Applicant: HEWLETT-PACKARD DEVELOPMENT COMPANY, L.P., Spring, TX (US)

(72) Inventors: Stephen L. Albright, Corvallis, OR (US); Timothy Jay Bouma, Corvallis, OR (US); Shane Shivji, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 31 days.

(21) Appl. No.: 16/605,525

(22) PCT Filed: Mar. 13, 2018

(86) PCT No.: PCT/US2018/022208
§ 371 (c)(1),
(2) Date: Oct. 16, 2019

(87) PCT Pub. No.: WO2019/177595
PCT Pub. Date: Sep. 19, 2019

(65) Prior Publication Data
US 2021/0286563 A1  Sep. 16, 2021

(51) Int. Cl.
*B41J 11/00* (2006.01)
*G06F 3/12* (2006.01)
*H04N 1/034* (2006.01)
*B41J 2/045* (2006.01)
*B41J 2/01* (2006.01)
*B41J 11/50* (2006.01)
*B41J 2/38* (2006.01)

(52) U.S. Cl.
CPC .......... *G06F 3/1204* (2013.01); *B41J 11/002* (2013.01); *G06F 3/1229* (2013.01); *B41J 2/01* (2013.01); *B41J 2/04556* (2013.01); *B41J 2/38* (2013.01); *B41J 11/008* (2013.01); *B41J 11/009* (2013.01); *B41J 11/50* (2013.01); *H04N 1/034* (2013.01)

(58) Field of Classification Search
None
See application file for complete search history.

(56) References Cited

U.S. PATENT DOCUMENTS

| | | | |
|---|---|---|---|
| 5,175,735 | A | 12/1992 | Dahlby et al. |
| 6,441,920 | B1 | 8/2002 | Smith |
| 7,161,705 | B2 | 1/2007 | Klassen |
| 7,742,185 | B2 | 6/2010 | Lofthus et al. |
| 8,836,965 | B2 | 9/2014 | Yamada et al. |

(Continued)

FOREIGN PATENT DOCUMENTS

EP  0962854 A2  12/1999

OTHER PUBLICATIONS

Xerox WorkCentre 7775 Multifunction Printer, 2012, Xerox Corporation, Available on the Internet: https://cdn2.hubspot.net/hubfs/2561801/Usacopiers%20Sep%202017%20Folder/PDF/Xe.

*Primary Examiner* — Haris Sabah
(74) *Attorney, Agent, or Firm* — Steven R. Ormiston

(57) ABSTRACT

In one example, an inkjet web printer includes a print engine and a controller programmed to determine that a second print job following a first print job may be printed without stopping the web and, without stopping the web, cause the print engine to print the second print job.

9 Claims, 5 Drawing Sheets

(56) References Cited

U.S. PATENT DOCUMENTS

| | | | |
|---|---|---|---|
| 8,926,048 B2* | 1/2015 | Naito | B41J 11/008 |
| | | | 347/16 |
| 2001/0050459 A1 | 12/2001 | Tamura et al. | |
| 2002/0001006 A1* | 1/2002 | Matsumoto | B41J 11/008 |
| | | | 347/16 |
| 2003/0079383 A1 | 5/2003 | Blackman et al. | |
| 2008/0037053 A1 | 2/2008 | Boyd et al. | |
| 2009/0232522 A1 | 9/2009 | Takahashi | |
| 2014/0232797 A1* | 8/2014 | Onodera | F26B 3/20 |
| | | | 347/102 |
| 2016/0075154 A1 | 3/2016 | Hacker et al. | |
| 2016/0167401 A1* | 6/2016 | Ebihara | B41J 11/0022 |
| | | | 347/102 |
| 2017/0008317 A1 | 1/2017 | Cummins et al. | |
| 2017/0282601 A1* | 10/2017 | Boland | B41J 11/0024 |
| 2018/0001644 A1 | 1/2018 | Hirosawa et al. | |
| 2021/0354483 A1* | 11/2021 | Hada | B41J 11/42 |

* cited by examiner

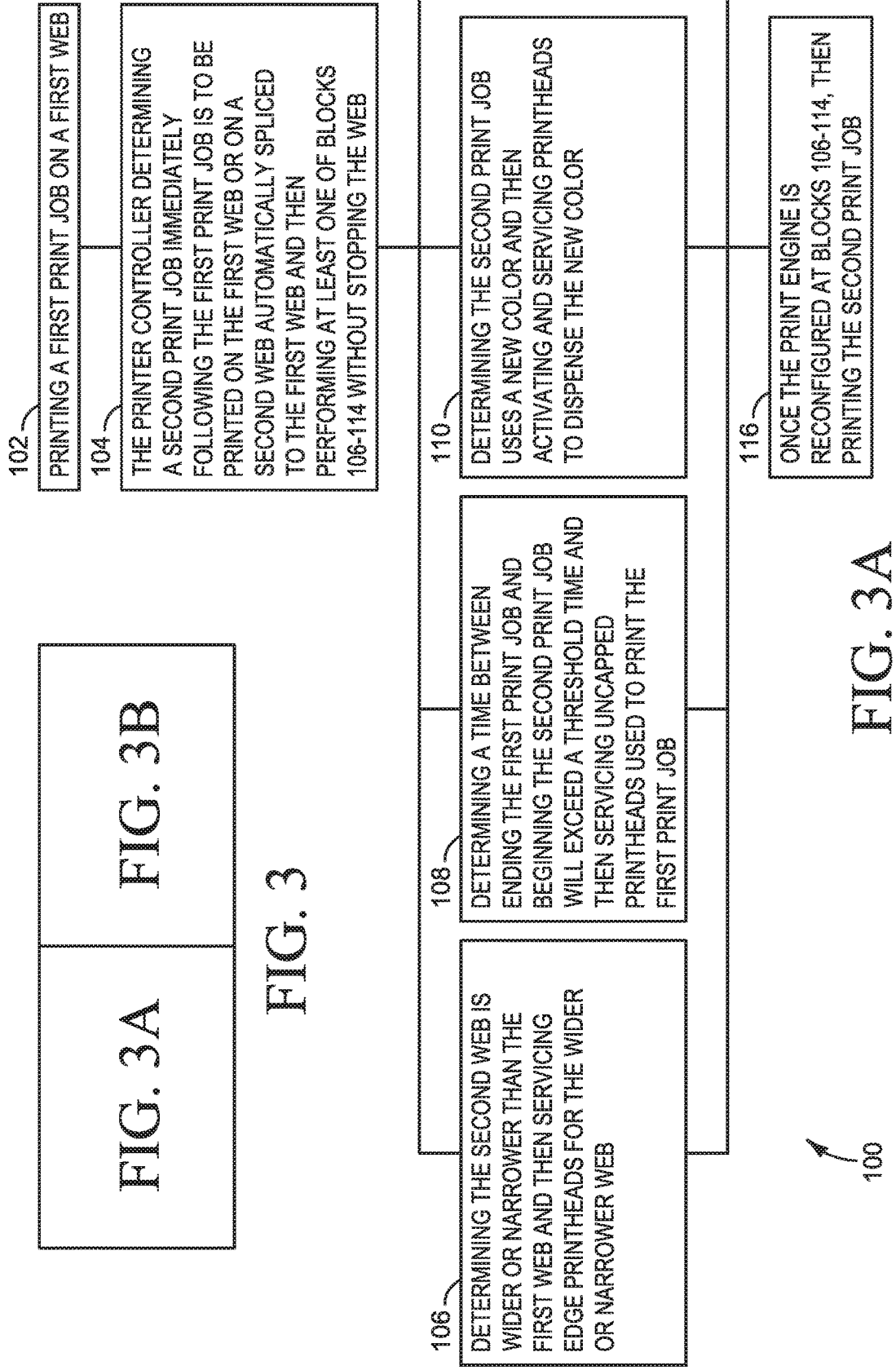

AUTOMATICALLY RECONFIGURING A WEB PRINTER

BACKGROUND

High speed digital inkjet web printers, sometimes called digital web "presses", utilize an array of stationary inkjet printheads to dispense ink across the full width of a paper or other printable web as the web moves past the printheads. Automatic splicing winders allow web printers to receive an uninterrupted supply of printable web from one web supply roll to the next web supply roll.

DRAWINGS

Figure 1:
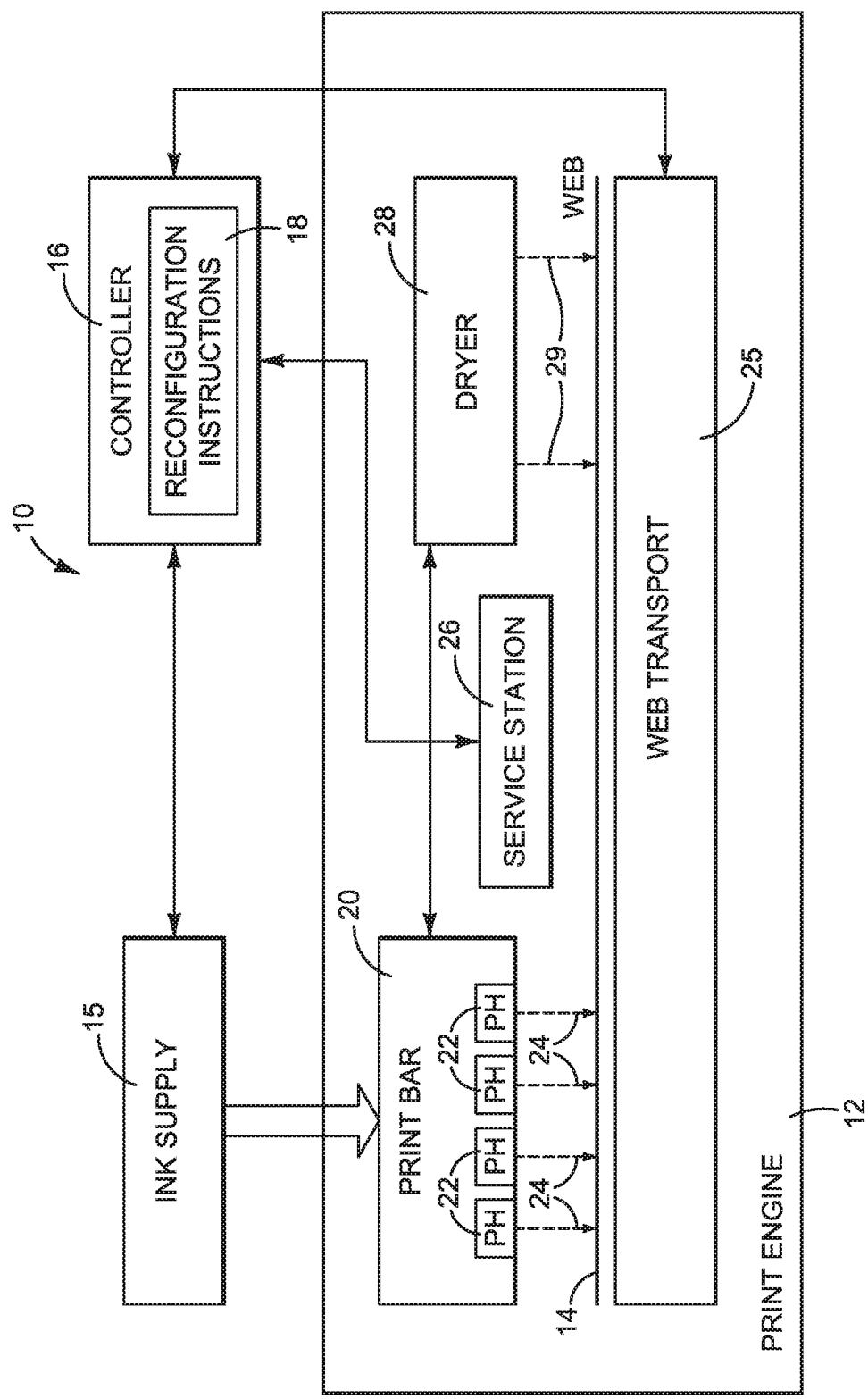
Figure 2:
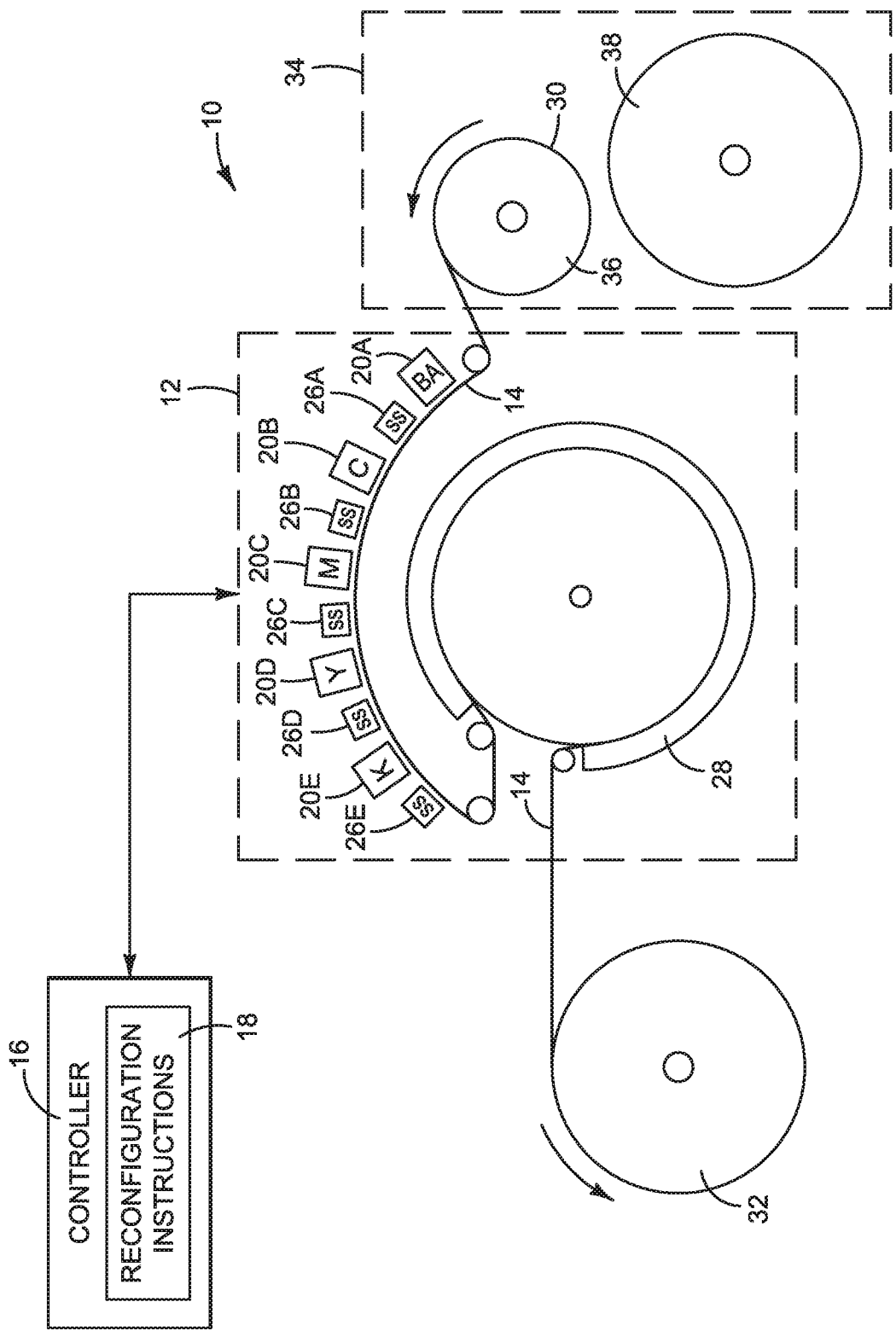

FIGS. 1 and 2 illustrate examples of an inkjet web printer with a controller programmed to automatically reconfigure the print engine for a successive, next print job.

Figure 3B:
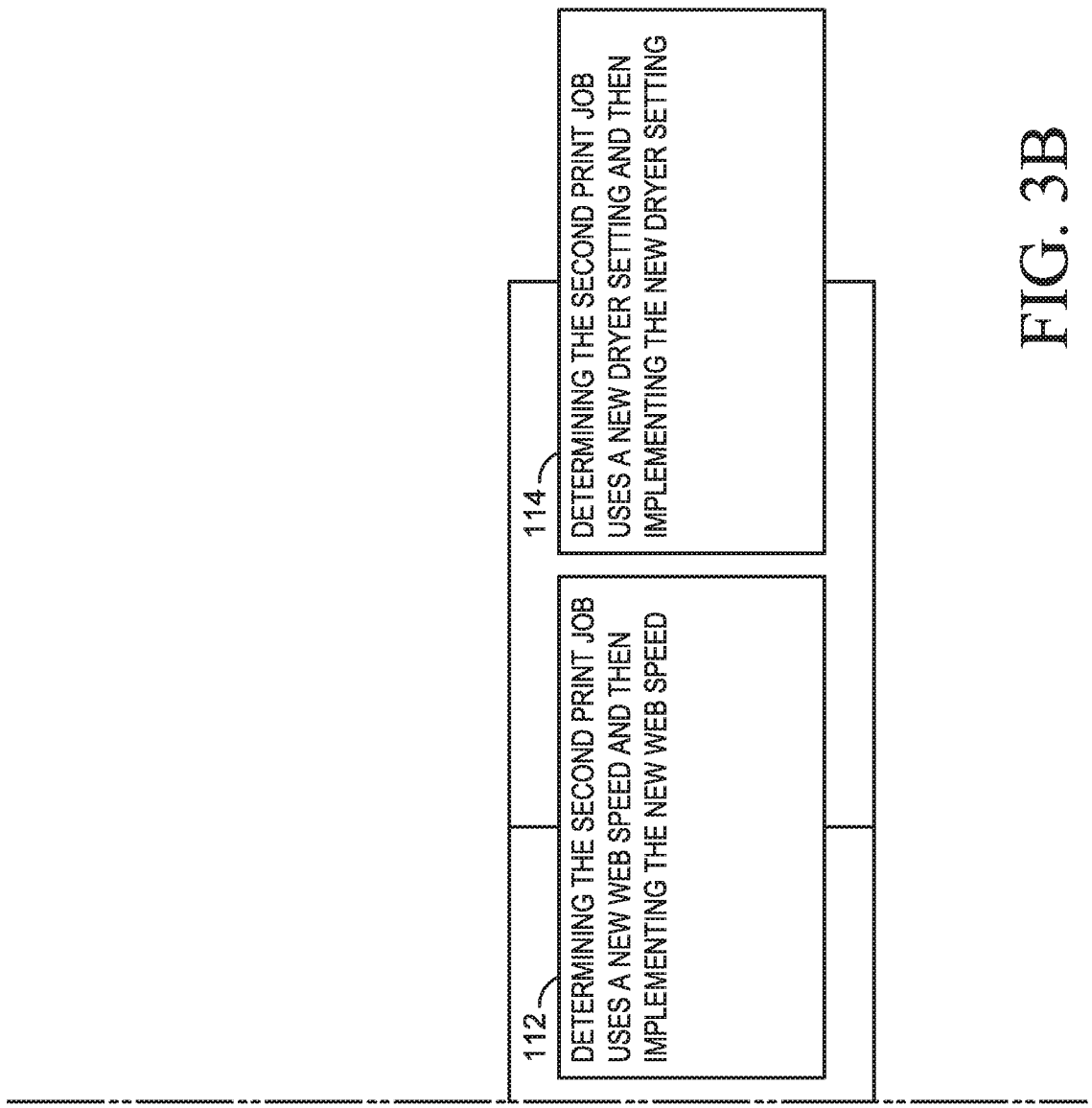
Figure 4:
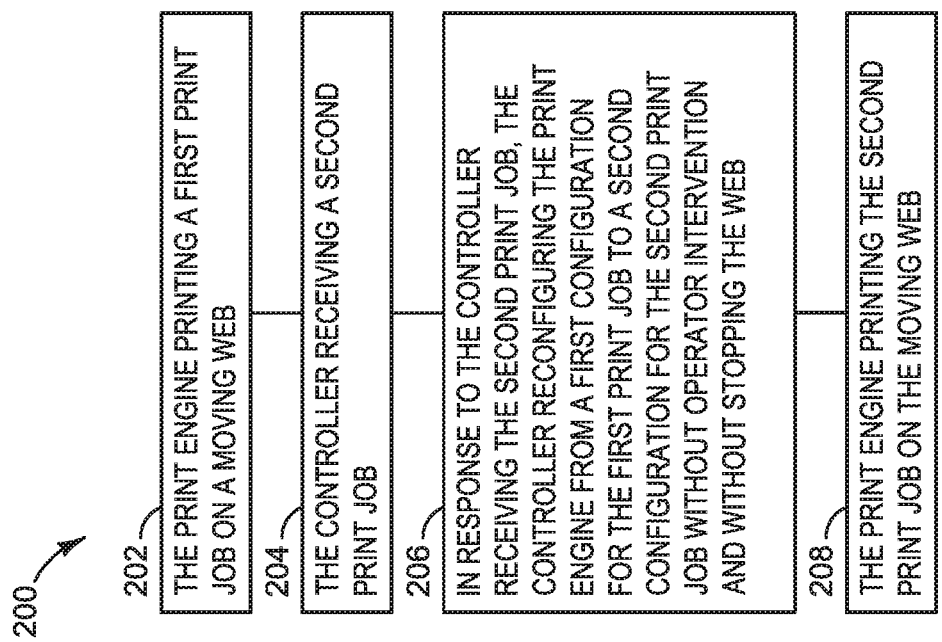

FIGS. 3 and 4 are flow diagrams illustrating example methods to automatically reconfigure a print engine in a web printer for a successive, next print job. FIG. 3 is broken down into FIG. 3A on sheet 3/5 and FIG. 3B on sheet 4/5 because the flow diagram does not fit on a single sheet.

Figure 5:
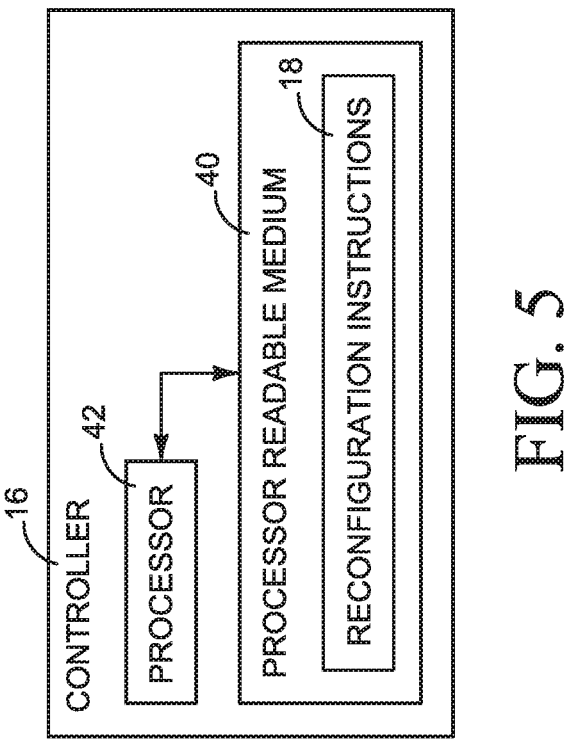

FIG. 5 is a block diagram illustrating one example of a printer controller such as might be used in a printer shown in FIGS. 1 and 2.

The same part numbers designate the same or similar parts throughout the figures.

DESCRIPTION

Automatic splicing winders enable web printers to change web supply rolls without stopping the web. Currently, the web in a high speed inkjet web printer is stopped between print jobs as an operator reconfigures components of the print engine for changes associated with the next print job. A new technique has been developed to reconfigure inkjet print engine components between successive print jobs automatically, without stopping the web and without operator intervention, to reduce the time to begin printing the next print job. In one example, the printer controller includes programming to receive a second print job while a first print job is printing and determine that the print engine can be reconfigured automatically for the second print job. Thus, for example, if the printer controller determines that the web for a second print job that follows immediately after a first print job is the same as or may be automatically spliced to the web for the first print job, then the printer controller reconfigures the print engine for the second print job automatically, without operator intervention and without stopping the web. Automatic reconfiguration may include, for example:

if the controller determines that the second web is wider than the first web, then servicing edge printheads that will be used to print on the wider web;

if the controller determines that the second web is narrower than the first web, then servicing edge printheads that will not be used to print on the narrower web;

if the controller determines that a time between ending the first print job and beginning the second print job will exceed a threshold time, then servicing printheads used to print the first print job;

if the controller determines that the second print job uses a new color, then activating and servicing printheads to dispense the new color;

if the controller determines that the second print job uses a new web speed, then implementing the new web speed; and if the controller determines that the second print job uses a new dryer setting, then implementing the new dryer setting.

These and other examples described below and shown in the figures illustrate but do not limit the scope of the patent, which is defined in the Claims following this Description.

As used in this document, "and/or" means one or more of the connected things; "new" means not used in the immediately preceding print job; and a "processor readable medium" means any non-transitory tangible medium that can embody, contain, store, and/or maintain information and instructions for use by a processor and may include, for example, circuits, integrated circuits, ASICs (application specific integrated circuits), hard drives, random access memory (RAM), read-only memory (ROM), and flash memory. Printhead servicing operations may include, for example, capping and uncapping a printhead, wiping a printhead, and dispensing ink from a printhead (commonly referred to as "spitting").

FIGS. 1 and 2 illustrate examples of an inkjet web printer 10 with a controller programmed to automatically reconfigure the print engine for the next print job. Referring to FIGS. 1 and 2, a printer 10 includes a print engine 12 to print on a paper or other printable web 14, an ink supply 15 to supply ink to print engine 12, and a controller 16. Controller 16 represents the programming, processing and memory resources, and the electronic circuitry and components needed to control the operative elements of print engine 12. In particular, controller 16 includes reconfiguration programming instructions 18. As described in detail below with reference to FIGS. 3-5, instructions 18 enable controller 16 to automatically reconfigure components of print engine 12 for the next print job. Although controller 16 is shown separate from print engine 12 in FIGS. 1 and 2, some or all of the elements of a controller 16 implementing reconfiguration instructions 18 may be part of print engine 12, for example in what is sometimes referred to as a "print engine controller."

Print engine 12 includes a print bar 20 holding multiple printheads 22 to dispense ink 24 simultaneously across the full width of web 14 as the web is moved past the printheads at the urging of a web transport system 25. In the example shown in FIG. 2, print engine 12 includes multiple print bars 20A-20E each with multiple printheads arranged along an arc, for example to dispense a bonding agent (BA), cyan (C) ink, magenta (M) ink, yellow (Y) ink, and black (K) ink. More or fewer print bars to print more, fewer, or different inks and agents than those shown may be used. Print engine 12 also includes a service station 26 to service printheads 22 and a dryer 28 to dry ink on web 14. Dryer 28 may be implemented with any suitable drying medium 29 including, for example, hot air and/or infrared light.

In the example shown in FIG. 2, print engine 12 includes multiple service stations 26A-26E each to service the printheads on a corresponding print bar 20A-20E. Servicing operations may include, for example, capping and uncapping a printhead, wiping a printhead, and dispensing ink from a printhead (commonly referred to as "spitting"). In one example, each print bar 20A-20E may be lifted away from web 14 and a service station 26A-26A inserted to perform servicing operations. Although a single block is shown for each service station, each service station may include multiple individual stations or modules to perform one or more servicing operations. For example, each service station 26A-26E usually will include individual stations for capping/uncapping printheads and for wiping the printheads.

Referring to FIG. 2, web transport 25 moves web 14 from a web supply 30 through print engine 12 to a web take-up 32. Web supply 30 includes an automatic splicer 34 to splice together the web on a first roll 36 to the web on a second roll 38 without stopping web 14. Web transport 25 may include idler rollers, drive rollers, an unwinder at supply 30, and a winder at take-up 32, for example, to help move web 14 through print engine 12 at the desired speed, tension and alignment.

FIGS. 3 and 4 are flow diagrams illustrating example methods 100 and 200, respectively, to automatically reconfigure a print bar 20, printhead 22, dryer 28 and/or other components of a print engine 12 in a web printer 10 for a successive, next print job. Method 100 in FIG. 3 and method 200 in FIG. 4 may be implemented, for example, by controller 16 executing reconfiguration instructions 18. Part numbers in the description of methods 100 and 200 refer to FIGS. 1 and 2. FIG. 3 is broken down into FIG. 3A on sheet 3/5 and FIG. 3B on sheet 4/5 because the flow diagram does not fit on a single sheet.

Referring first to FIG. 3, method 100 includes printing a first print job on a first web 14/36 (block 102) and the printer controller determining that a second print job immediately following the first print job is to be printed on the first web 14/36 or on a second web 14/38 automatically spliced to the first web 14/36 (block 104). If the printer controller determines that a second print job immediately following the first print job is to be printed on the first web 14/36 or on a second web 14/38 automatically spliced to the first web 14/36 at block 104, then at least one of the following actions is performed without operator intervention and without stopping the web 14:

determining that the second web 14/38 is wider or narrower than the first web 14/36 and then servicing edge printheads for the wider or narrower web (block 106);

determining that a time between ending the first print job and beginning the second print job will exceed a threshold time and then servicing uncapped printheads used to print the first print job (block 108);

determining that the second print job uses a new color and then activating and servicing printheads to dispense the new color (block 110);

determining that the second print job uses a new web speed and then implementing the new web speed (block 112); and determining that the second print job uses a new dryer setting and then implementing the new dryer setting (block 114).

Once print engine 12 is reconfigured at blocks 106-114 then printing the second print job (block 116).

Servicing edge pens at block 106 may include uncapping edge printheads that will be used to print the second print job on a wider second web but that were not used for the first print job, or capping printheads used for the first print job but that will not be used to print the second print job on a narrower second web. A threshold time at block 108 is sometimes referred to as a "decap" time, a setting corresponding to the amount of idle time that an inkjet printhead may be left uncapped and still reliably dispense ink drops when activated.

Referring now to FIG. 4, method 200 includes the print engine 12 printing a first print job on a moving web 14 (block 202), the printer controller 16 receiving a second print job (block 204), in response to receiving the second print job, the printer controller 16 reconfiguring the print engine 12 from a first configuration for the first print job to a second configuration for the second print job without operator intervention and without stopping the web 14 (block 206), and then the print engine printing the second print job on the moving web 14.

In one example for method 200, reconfiguring the print engine at block 206 includes at least one of servicing uncapped printheads, uncapping and servicing a printhead to dispense a new color, uncapping and servicing a printhead to dispense a bonding agent, implementing a new alignment, changing the web speed for printing, and implementing a new dryer setting.

In one example for method 200, printing the first print job on a moving web at block 202 includes printing the first print job on a moving first web 14/36, printing the second print job on a moving web in block 204 includes printing the second print job on a moving second web 14/38 that is wider or narrower than the first web 14/36, and reconfiguring the print engine includes, if the second web is wider than the first web, uncapping and servicing one or multiple edge printheads that will be used to print on the wider web or, if the second web is narrower than the first web, capping one or multiple edge printheads that will not be used to print on the narrower web.

FIG. 5 is a block diagram illustrating one example of a printer controller 16 in FIGS. 1 and 2. Referring to FIG. 5, controller 16 includes a processor readable medium 40 and a processor 42 to execute programming on processor readable medium 40. In this example, the programming on processor readable medium 40 includes reconfiguration instructions 18. Reconfiguration instructions 18 may include, for example, instructions to perform a process 100 shown in FIG. 3. Reconfiguration instructions 18 may include, for another example, instructions to perform a process 200 shown in FIG. 4.

The examples shown in the figures and described above illustrate but do not limit the patent, which is defined in the following Claims.

"A", "an" and "the" used in the claims means one or more.

The invention claimed is:

1. An inkjet web printer, comprising:
  a print engine including:
    multiple inkjet printheads arranged to dispense ink across a full width of a web;
    a web transport to move the web past the printheads, the web transport including a splicer to automatically splice together the web on succeeding web supply rolls;
    a service station to service the printheads;
    a dryer to dry ink on the web; and
  a controller operatively connected to the print engine and programmed to:
    determine that a second print job following a first print job may be printed without stopping the web;
    determine that a second web for the second print job is wider or narrower than a first web for the first print job;
    cause the service station to service edge printheads for the wider or narrower second web; and
    cause the print engine to print the second print job.

2. The printer of claim 1, where the controller is programmed to:
  determine that a time between ending the first print job and beginning the second print job will exceed a threshold time; and cause the service station to service uncapped printheads used to print the first print job.

3. The printer of claim 1, where the controller is programmed to:
   determine that the second print job uses a new color; and
   cause the service station to service a printhead to dispense the new color.

4. The printer of claim 1, where the controller is programmed to:
   determine that the second print job uses a bonding agent; and
   cause the service station to service a printhead to dispense the bonding agent.

5. The printer of claim 1, where the controller is programmed to:
   determine that the second print job uses a new web speed; and
   cause the print engine to implement the new web speed.

6. The printer of claim 1, where the controller is programmed to:
   determine that the second print job uses a new alignment; and
   cause the print engine to implement the new alignment.

7. The printer of claim 1, where the controller is programmed to:
   determine that the second print job uses a new dryer setting; and
   cause the dryer to implement the new dryer setting.

8. A tangible non-transitory processor readable medium having instructions thereon that when executed cause a web printer to:
   print a first print job on a first web;
   determine that a second print job following the first print job is to be printed on the first web or on a second web automatically spliced to the first web, and then perform at least one of the following without stopping the first web or a second web:
      determine that a second web is wider or narrower than the first web and then service an edge printhead for the wider or narrower second web;
      determine that a time between ending the first print job and beginning the second print job will exceed a threshold time and then service uncapped printheads;
      determine that the second print job uses a new color and then activate and service a printhead to dispense the new color;
      determine that the second print job uses a bonding agent and then service a printhead to dispense the bonding agent;
      determine that the second print job uses a new web speed and then implement the new web speed; and
      determine that the second print job uses a new dryer setting and then implement the new dryer setting; and
   print the second print job.

9. The medium of claim 8, where the instructions include instructions to determine that the second web is wider or narrower than the first web and then:
   service edge printheads for the wider or narrower second web; and
   automatically splice the second web to the first web.

* * * * *